J. L. NIX.
HEATING DEVICE FOR INCUBATORS.
APPLICATION FILED NOV. 12, 1907.

964,680.

Patented July 19, 1910.

WITNESSES

INVENTOR
James L. Nix
by Hopkins & Eicks attys

UNITED STATES PATENT OFFICE.

JAMES L. NIX, OF HOMER CITY, PENNSYLVANIA.

HEATING DEVICE FOR INCUBATORS.

964,680. Specification of Letters Patent. Patented July 19, 1910.

Application filed November 12, 1907. Serial No. 401,874.

*To all whom it may concern:*

Be it known that I, JAMES L. NIX, a citizen of the United States, and resident of Homer City, Pennsylvania, have invented certain new and useful Improvements in Heating Devices for Incubators, of which the following is a specification.

My invention relates to improvements in heating devices for incubators, and has for its object to provide a heating device for use in incubators in which a lamp is employed and means are provided whereby the fumes of the lamp are carried to the exterior of the room in which the incubator is operated.

Figure 1:
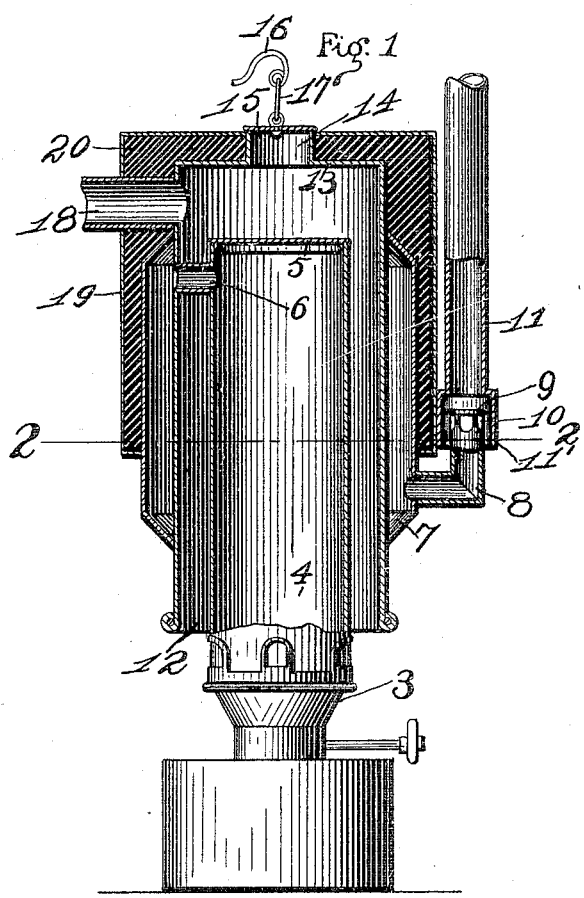
Figure 2:
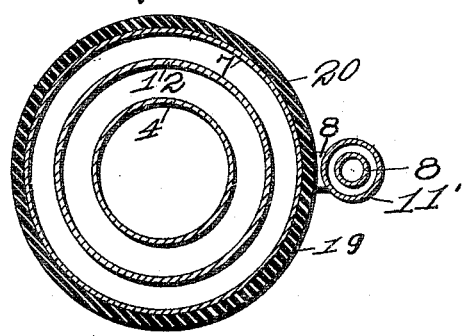

In the drawings—Figure 1 is a vertical section of a device embodying my invention. Fig. 2 is a transverse horizontal view in section taken along the line 2—2 of Fig. 1.

As shown in the drawings, the lamp 3 is seated beneath the vertical flue 4 which is provided at its top with the cap 5, and near its top by the outlet flue 6. The outlet flue 6 enters the drum 7, which completely surrounds the vertical flue 4 and is provided at its side opposite to that at which the outlet flue 6 enters with the chimney elbow 8, which emerges near the bottom of the drum 7. The elbow 8 is provided at its top with the cap 9 and the opening 10. The chimney 11 is mounted above the elbow 8 and is enlarged at its bottom as indicated by the numeral 11′ in order that the top of the elbow 8 may be loosely seated within it so as to provide for an upward circulation of air to the chimney 11. The chimney 11 extends through the wall and through the exterior of the room within which the incubator is being operated.

The supply of heated fresh air for the interior of the incubator is provided by means of the open-mouthed drum 12, which is interposed between the vertical flue 4 and the drum 7, and is provided at its top with a cap 13 carrying the concentric pipe 14, which is opened or closed by means of the damper 15. The damper 15 is suspended from the regulator bar 16 by means of the link 17, and the movement of the regulator bar 16 is controlled by means of any desired thermostat; the thermostatic control of the damper 15 being well known in the art and the details therefore are not shown in the drawings.

The drum 12 is provided near its top with a transverse flue 18 which extends to the interior of the incubator.

The drum 7, the upper portion of the drum 12 and the flue 18 are surrounded by the jacket 19, which is provided with packing 20 of asbestos or the like.

The primary object attained by the heating device thus described is to pipe out of doors the gases generated by the lamp used in incubation. I have ascertained in practice that where large numbers of incubators are operated in a single incubation room, and in practice from ten to one hundred or more are frequently so operated in one room, the air becomes so contaminated from the fumes generated by the lamp that poor hatches result, and even if the percentage of the hatch is average or above average, the chicks are too weak to raise satisfactorily; and the chicks produced under such conditions are peculiarly susceptible of white diarrhea, which disease is attended by a high percentage of fatality.

In the actual operation of incubators embodying the above-described invention, large numbers thereof being operated in a common incubation room, analysis of the heated air from the interior of the incubators has disclosed it to be absolutely pure and free from contamination by the fumes of the lamp.

In the construction of the drums and flues hereinabove described, the object is also attained of permitting the escape of any down-draft occurring in the chimney 11 during storms, through the bottom of said chimney 11, the cap 9 preventing said down-draft from entering the elbow 8 and its connections and blowing out the lamp.

I am aware that in this art the fumes generated by the flame of the lamp have heretofore had their heating units utilized by means of drums or jackets inclosing the lamp chimney; and I do not claim such a structure broadly. It is the purpose of my invention to carry such fumes away from their containing drums to a point outside of the room in which the incubator is operated, so that such fumes, charged, as they are, with carbon monoxid and other noxious gases, can by no possible means be commingled with the heated atmospheric air passing into the interior of the incubator. Furthermore, an object of my invention is to so locate the pipe elbow 8, at or near the bottom of the drum 7, that the heavier and most noxious products of combustion created by the burning of the lamp will first be withdrawn to the exterior of the incubator and discharged out of doors. Were the outlet pipe elbow 8 mounted otherwise than at or near the bottom of the drum 7, these heavy and deleterious gases would be accumulated in the bottom of the drum 7 and in the event of accidental leakage in said drum 7, would find an exit from said drum and through the open-mouthed drum 12, or otherwise, to the interior of the incubator.

Having fully described my invention, what I claim as new and desire to have secured to me by the grant of Letters Patent, is:

1. A heating device for incubators comprising a lamp, a chimney 4 provided with a cap 5 and seated upon said lamp; an open-bottomed drum surrounding said chimney; a transverse flue extending from the said drum near its top to the interior of the incubator; a cap provided with a concentric opening and mounted on the upper end of said drum; a pipe mounted in said concentric opening; a damper seated in the mouth of said pipe; a second drum inclosing the first-named drum; a flue connecting the interior of the chimney with the interior of the second drum; a vertically mounted pipe elbow extending from said second drum, its outer mouth being apertured about its periphery and provided with a closure; and a vertically mounted chimney within whose mouth the outer mouth of said elbow is loosely seated, substantially as described.

2. A heating device for incubators comprising a lamp; a chimney mounted upon the lamp and provided with a closure at its top; an open-bottomed drum concentrically mounted about said chimney; a transverse flue extending from said drum near its top to the interior of the incubator; a cap provided with a concentric opening and mounted upon the upper end of said drum; a vertical pipe mounted in said concentric opening; a damper seated in the mouth of said pipe; a second drum concentrically mounted about and incasing the first-named drum; a flue connecting the interior of the chimney with the interior of the second drum; a vertically mounted pipe elbow extending outwardly from said second drum, its outer arm being directed upwardly and its mouth being apertured about its periphery and provided with a closure; and a vertically mounted chimney within whose mouth the outer mouth of said elbow is loosely seated, substantially as described.

3. A heating device for incubators comprising a lamp; a chimney mounted upon the lamp and provided with a closure at its top; an open-bottomed drum concentrically mounted about said chimney; a transverse flue extending from said drum near its top to the interior of the incubator; a cap provided with a concentric opening and mounted upon the upper end of said drum; a vertical pipe mounted in said concentric opening; a damper seated in the mouth of said pipe; a second drum concentrically mounted about and incasing the first-named drum; a flue connecting the interior of the chimney with the interior of the second drum; a pipe elbow mounted at or near the bottom of said second drum, its outer arm being directed upwardly and its mouth being apertured about its periphery and provided with a closure; and a vertically mounted chimney within whose mouth the outer mouth of said elbow is loosely seated, substantially as described.

In testimony whereof, I have signed my name to this specification, in presence of two subscribing witnesses.

JAMES L. NIX.

Witnesses:
DAVID F. BERRY,
WM. PHILIP.